United States Patent [19]

Momose

[11] Patent Number: 5,205,660
[45] Date of Patent: Apr. 27, 1993

[54] PRINTER CAPABLE OF GENERATING REDUCED WIDTH BOLD CHARACTERS

[75] Inventor: Hiroaki Momose, Nagano, Japan

[73] Assignee: Seiko Epson Corporation, Tokyo, Japan

[21] Appl. No.: 925,013

[22] Filed: Aug. 5, 1992

[30] Foreign Application Priority Data

Sep. 18, 1991 [JP] Japan .................. 3-238133

[51] Int. Cl.$^5$ .............................. B41J 2/505
[52] U.S. Cl. ................. 400/304; 395/109; 395/150; 340/790; 400/121
[58] Field of Search ............ 400/121, 210, 304; 395/109, 110, 150; 340/730, 731, 735, 790

[56] References Cited

U.S. PATENT DOCUMENTS 4,602,880 7/1986 Oba ....................... 400/304

FOREIGN PATENT DOCUMENTS 63172 4/1985 Japan ..................... 400/210
3-120060 5/1991 Japan ..................... 400/304

Primary Examiner—David A. Wiecking
Assistant Examiner—Steven S. Kelley
Attorney, Agent, or Firm—Sughrue, Mion, Zinn Macpeak & Seas

[57] ABSTRACT

A printer that includes a means for storing print data of a character; a first converter for converting print data to be read into a single dot pattern by performing the function of logical OR of a total of four dot patterns, assuming that a print head moving direction is a horizontal direction. The four dot patterns are: the print data, data next to such print data, data four pieces of data ahead, and data five pieces of data ahead. The printer also includes an inverter for inverting the single dot pattern generated by the first converter; a second converter for converting two dot patterns into a single dot pattern by performing the function of logical AND of two dot patterns. These two dot patterns are: a dot pattern newly generated by the first converter and the dot pattern inverted by the inverter, so that the number of horizontally extending data of a bold character is changed and compressed to thereby create a reduced bold character and print such reduced bold character.

3 Claims, 5 Drawing Sheets

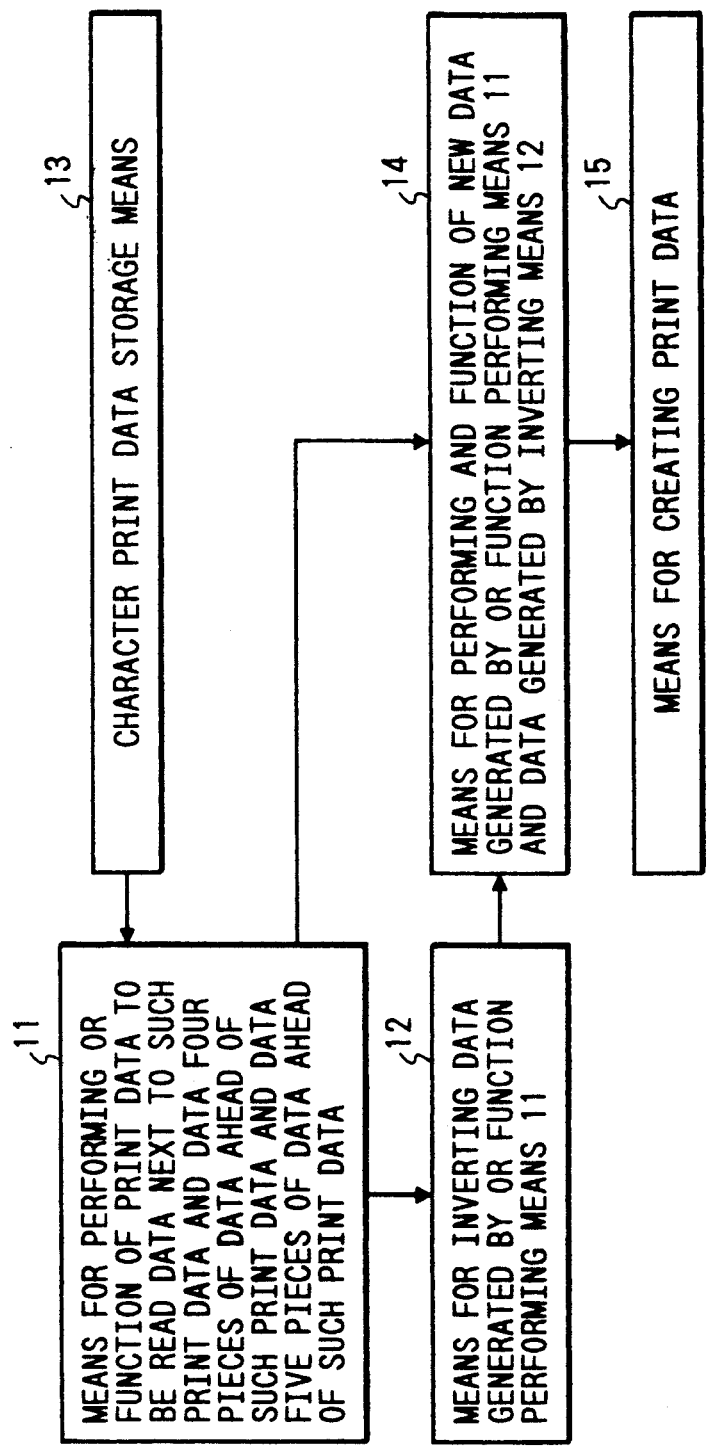

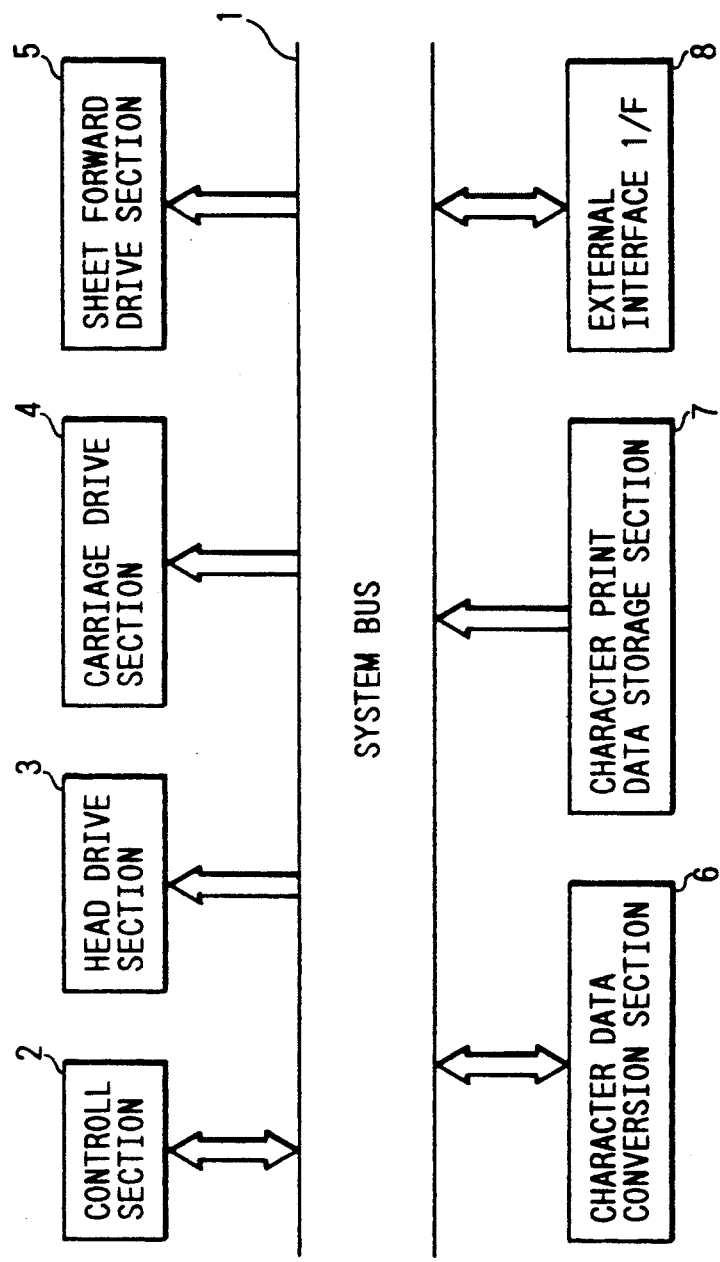

MASK DOTS CONTINUOUS TO THE LEFT AND STORE SUCH MASKED DOTS

NORMAL CHARACTER

BOLD CHARACTER

REDUCED CHARACTER

REDUCED BOLD CHARACTER

REDUCED BOLD
CHARACTER

PRINTER CAPABLE OF GENERATING REDUCED WIDTH BOLD CHARACTERS

BACKGROUND OF THE INVENTION

1. Field of the Invention

The invention relates to printers which are capable of printing bold characters.

2. Prior Art

With respect to characters to be printed by terminal printers, those not bolded, reduced, enlarged, etc. are considered normal characters. As shown in FIGS. 4(a) through 4(d), a conventional method of printing a reduced bold character involves the steps of creating a normal-width bold character shown in FIG. 4(b) from a normal character shown in FIG. 4(a), and of printing the created character at the same print timing T as the normal character while reducing the head moving speed V by half to V/2, to produce a reduced bold character shown in FIG. 4(d) in a manner similar to a reduced character shown in FIG. 4(c), where V is the speed of moving a print head for printing normal-width bold characters and T is the print timing. As another conventional printing method, as shown in FIG. 5, the printer has previously stored character data designed as reduced bold character and prints such character data as print data at a head moving speed V that is the same as that of the normal-width bold character and at the same print timing T to produce a reduced bold character.

However, the former conventional art requires that a unit for halving the head moving speed be provided. Also, the latter conventional art requires that character data designed as a reduced bold character for a normal character be stored in an internal memory, thus addressing the problem of reserving a memory capacity large enough to accommodate such data.

SUMMARY OF THE INVENTION

The invention has been made to overcome the above problems. Accordingly, an object of the invention is to allow a reduced bold character of a normal character to be printed without requiring a unit for halving the moving speed in a print head moving means and without storing reduced bold character data of a normal character in an internal memory by creating such reduced bold character data of the normal character based on character data of the normal character.

The above object has been achieved by provision of a printer that includes a means for storing print data of a character; a first conversion means for converting print data to be read into a single dot pattern by performing the function of OR of a total of four dot patterns, assuming that a print head moves in a horizontal direction. The four dot patterns are: the print data, data next to such print data, data four pieces of data ahead, and data five pieces of data ahead. The printer also includes an inversion means for inverting the single dot pattern generated by the first conversion means; a second conversion means for converting two dot patterns into a single dot pattern by performing the function of AND of the two dot patterns. These two dot patterns are: a dot pattern newly generated by the first conversion means and a dot pattern inverted by the inversion means, so that the number of horizontally extending data of the bold character is changed and compressed to thereby create a reduced bold character and to print such reduced bold character.

According to the printer of the invention, e.g., a 14-dot wide reduced bold character can be created from a 24-dot wide character in the following manner. The function of OR of two adjacent pieces of data and two adjacent pieces of data which are two pieces of data ahead of the reference data is performed. Then, the thus generated print data and a horizontally continuous patterns are masked to generate a single piece of print data. Accordingly, the horizontal print data can be compressed without damaging the vertical print data, thereby allowing a reduced bold character to be printed without changing the head moving speed.

BRIEF DESCRIPTION OF THE DRAWINGS

FIG. 1 is a diagram showing a process configuration of the invention;

FIG. 2 is a block diagram showing an embodiment of the invention;

DETAILED DESCRIPTION OF THE PREFERRED EMBODIMENT

Figure 3A:
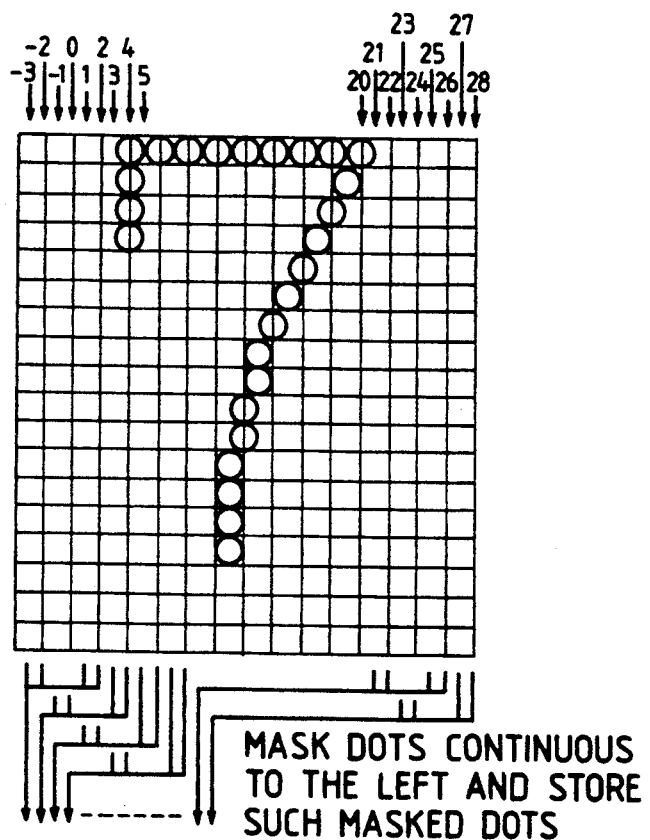
FIGS. 3(a) and 3(b) are diagrams showing the basic concept for generating a reduced bold character.

An embodiment of the invention will now be described with reference to the accompanying drawings.

FIG. 2 is a block diagram showing a printer according to an embodiment of the invention. A control section 2, a head drive section 3, a carriage section 4, a sheet forward drive section 5, a character print data storage section 7, a character data conversion section 6, and an external interface section 8 are connected to a system bus 1. The control section 2 includes circuits for controlling the entire system. The head drive section 3 includes a head for printing characters and a drive circuit thereof. The carriage section 4 includes a carriage carrying the head and travelling in a sheet forward direction as well as in the vertical direction, and a drive circuit thereof. The sheet forward drive section 5 includes a motor for forwarding print sheets and a drive circuit thereof. The character print data storage section 7 stores the dot patterns of characters to be printed. The character data conversion section 6 converts the character data of a character to be printed by referencing the character data. The external interface section 8 intercommunicates data with a host computer.

Figure 3B:
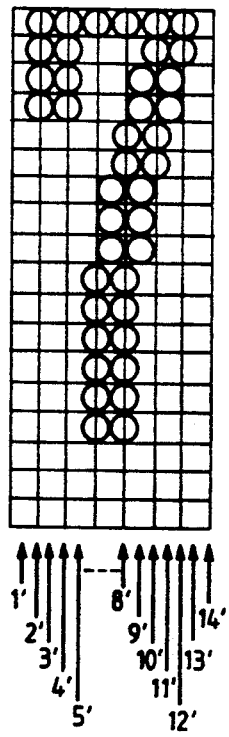
Figure 4A:
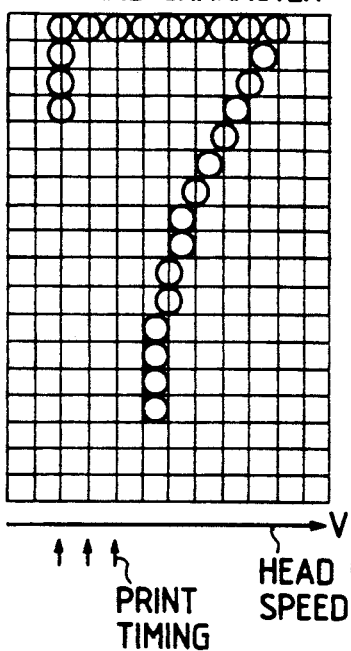
FIGS. 4(a) through 4(d) are diagrams showing an exemplary conventional art for printing a reduced bold character.
Figure 4B:
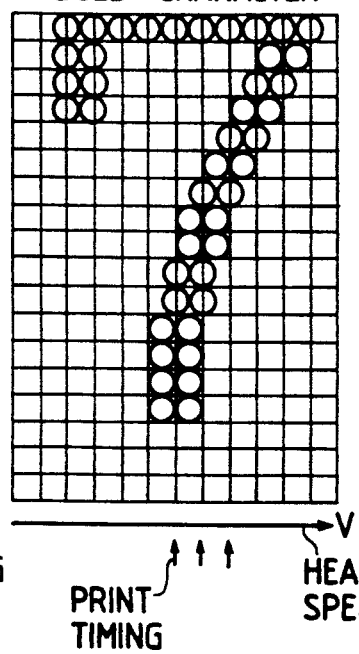
Figure 4C:
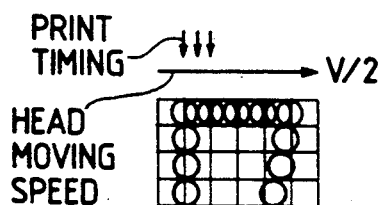
Figure 4D:
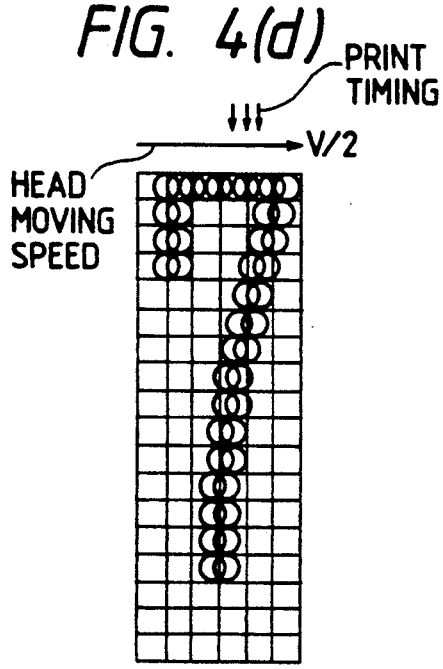
Figure 5:
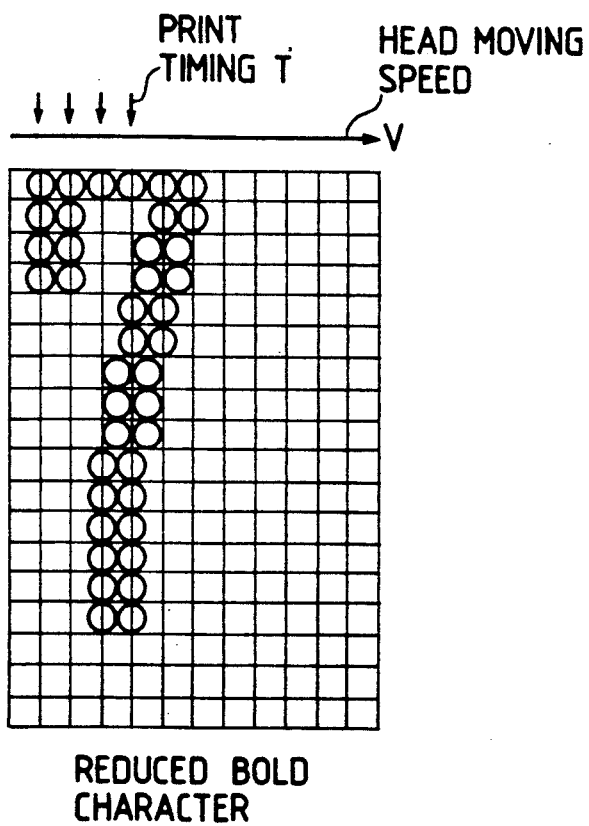
FIG. 5 is a diagram showing an exemplary conventional art for printing a reduced bold character.

A conversion method employed by the character data conversion section 6 will then be described. FIG. 1 is a diagram showing a conversion processing flow. FIGS. 3(a) and 3(b) are diagram showing the basic concept for compressing a 24-dot wide character into a 14-dot wide reduced character. FIG. 3(a) shows character data expressed in 240 dpi (dot per inch). Each circle indicates a single dot to be printed. It is assumed that 24-dot wide character data are designated from left to right as 1, 2, 3, 4, 5, 6, ... 21, 22, 23, and 24. Numerals 1 to 24 designate the actual character data. Numerals −3 to 0 and 25 to 28 are NULL data appended before and after the actual character data for conversion purposes. FIG. 3(b) shows character data of a 14-dot wide reduced bold character expressed in 240 dpi. As in FIG. 3(a) each circle indicates a single dot to be printed. It is also assumed that the 14-dot wide character data are designated from left to right as 1', 2', 3', 4', 5', 6', ... 10', 11', 12', 13', and 14'.

The method of converting the data from FIG. 3(a) to FIG. 3(b) is as follows. The function of OR of NULL data −3, −2 and print data 1, 2 of the horizontal print data, which are stored in a character print data storage means 13 in FIG. 1, is performed by an OR function performing means 11, and the function of AND of the above result and the NULL data inverted by an inverting means 12 is then performed by an AND function performing means 14. The data obtained therefrom is stored in data 1' in FIG. 3(b) by a print data creating means 15. Similarly, the function of OR of NULL data −1, 0 and print data 3, 4 is performed, and the function of AND of the above result and data inverting the print data generated at data 1' in FIG. 3(b) is then performed. The data obtained therefrom is stored in data 2' in FIG. 3(b). Then, the function of OR of print data 1, 2, 5 and 6 is performed, and the function of AND of the above result and data inverting the print data generated at data 2' in FIG. 3(b) is then performed. The data obtained therefrom is stored at data 3' in FIG. 3(b). Further, the function of OR of print data 3, 4, 7 and 8 is performed, and the function of OR of the above result and data inverting the print data generated at data 3' in FIG. 3(b) is then performed. The data obtained therefrom is stored at data 4' in FIG. 3(b). Then, the function of OR of print data 5, 6, 9 and 10 is performed, and the function of OR of the above result and data inverting the print data generated at data 4' in FIG. 3(b) is then performed. The data obtained therefrom is stored at data 5' in FIG. 3(b). These operations are similarly performed repetitively to the stage in which the function of OR of print data 21, 22 and NULL data 25, 26 in FIG. 3(a) is performed, and the function of OR of the above result and data inverting the print data generated at data 12' in FIG. 3(b) is then performed. The data obtained therefrom is stored at data 13' in FIG. 3(b). Further, the function of OR of print data 23, 24 and NULL data 27, 28 in FIG. 3(a) is performed, and the function of OR of the above result and data inverting the print data generated at data 13' in FIG. 3(b) is performed. The data obtained therefrom is stored at data 14' in FIG. 3(b).

Accordingly, the 14-dot wide reduced bold character is generated from the 24-dot wide character without losing the print data in the vertical direction. In addition, the print data to which emphasis is added is expressed in 240 dpi by masking the adjacent contiguous dots.

As a result, the 240-dpi, reduced bold character can be created, and the thus created print data is in a density of 240 dpi. That is, character data having print data whose density is X for a character can produce character data having print data whose density is X for the same character in the form of a reduced size. Since the density of the print data remains unchanged, it is no longer necessary to vary the print density by varying the print head moving speed, thus allowing a print head moving speed varying unit to be dispensed with. Further, since reduced characters are created in a bolded form, it is no longer necessary to internally store the character data thereof, thus allowing the internal memory to be saved.

As described above, the invention allows character data for print data whose density is X to be created in a bolded and reduced form from character data for print data whose print data density is X. Therefore, it is not necessary to provide a print head moving speed varying unit to change the print density, nor is it required to internally store character data for reducing print character whose density is X.

What is claimed is:

1. A printer capable of printing a reduced bold character, comprising:
   storage means for storing print data of a character;
   first converting means for converting print data stored in said storage means into a single dot pattern by performing an OR function of a total of four dot patterns, assuming that a print head moves in a horizontal direction, said four dot patterns being said print data, data next thereto, data four pieces of data ahead thereof, data five pieces of data ahead thereof;
   means for inverting said single dot pattern generated by said first converting means;
   second converting means for converting two dot patterns into a single dot pattern by performing an AND function of said two dot patterns, said two dot patterns being a new dot pattern generated by said first converting means and said dot pattern inverted by said inverting means, so that said print data is printed while changing a number of print data in the horizontal direction.

2. A printer as claimed in claim 1, wherein said storage means stores a 24-dot width character data and said second converting means creates a 14-dot width character data.

3. A printer as claimed in claim 1, further comprising means for masking data generated by said first conversion means and a pattern continuous in the horizontal direction to produce a single print data.

* * * * *